(No Model.)

O. P. WIVEL.
CAR STARTER.

No. 349,620. Patented Sept. 21, 1886.

WITNESSES:
A. C. Eader
John E. Morris

INVENTOR:
Oliver P. Wivel
BY Chas B. Mann
ATTORNEY.

UNITED STATES PATENT OFFICE.

OLIVER P. WIVEL, OF BALTIMORE, MARYLAND.

CAR-STARTER.

SPECIFICATION forming part of Letters Patent No. 349,620, dated September 21, 1886.

Application filed July 28, 1886. Serial No. 209,274. (No model.)

*To all whom it may concern:*

Be it known that I, OLIVER P. WIVEL, a citizen of the United States, residing at Baltimore, in the State of Maryland, have invented certain new and useful Improvements in Car-Starters, of which the following is a specification.

This invention relates to a car-starter for street-cars, and is illustrated in the accompanying drawings, in which—

Figure 1:
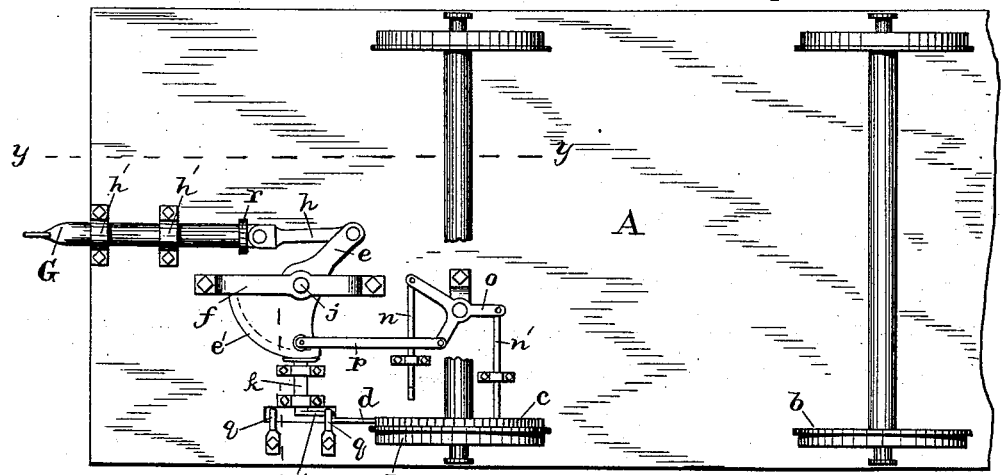
Figure 2:
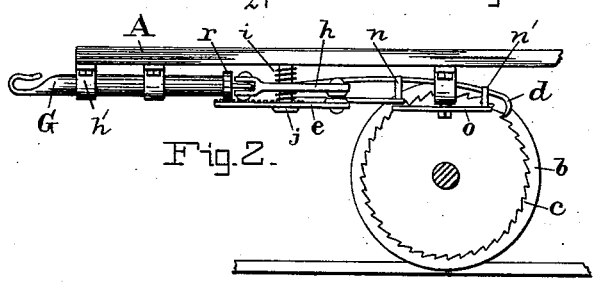
Figure 5:
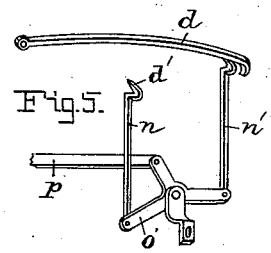
Figure 3:
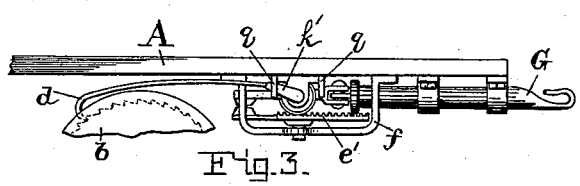
Figure 6:
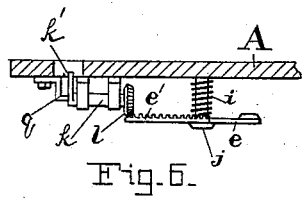
Figure 4:
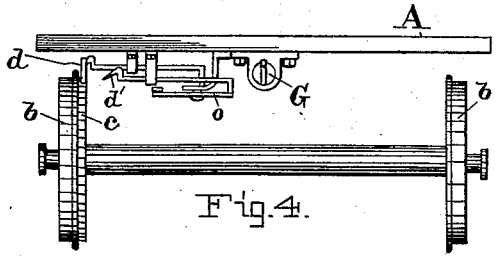

Figure 1 is a bottom or inverted plan view of a car and the starter. Fig. 2 is a vertical longitudinal section on line *y* of Fig. 1. Fig. 3 is a partial side elevation showing the opposite side to that seen in Fig. 2. Fig. 4 is a front or end view showing only the pawl-releasing mechanism. Fig. 5 is a top perspective view of the pawl-releasing mechanism detached from the car. Fig. 6 is a cross-section of the car, showing part of the mechanism on the line *z* of Fig. 1.

The letter A designates the car-body, and *b* the wheels. One wheel or more is provided on its inner side with a ratchet-tooth rim, *c*, preferably as large as the tread-face of the wheel, and a draft-pawl, *d*, engages with this ratchet. The mechanism which combines with these parts, and which constitutes this invention, will now be described.

A lever, *e*, has on one end a sector-gear, *e'*, and is pivoted in a suitable hanger, *f*. The other end of this lever is connected with the draw-bar G by a link, *h*. The draw-bar has endwise movement in bearings *h'*. A spiral spring, *i*, is about the shaft or pivot-bolt *j* of the said lever *e*, and is connected therewith in such way that its tension is exerted to throw the link end of the lever back, and thereby draw the draw-bar G, as seen in Fig.
1. The parts will occupy this position normally—that is, when the car is at rest—and when the animals start to pull the spring *i* will yield and the draw-bar G will be drawn out, which action brings the draft-pawl *d* to bear on the ratchet-rim *c*, as hereinafter described, and thereby start the car. A crank-shaft, *k*, has at one end a pinion, *l*, which engages with the sector-gear *e'* on the lever *e*, while its crank *k'* is connected with the draft-pawl *d*. It will thus be seen that the lever *e*, with its sector-gear *e'*, causes the crank-shaft *k* to rock or partly revolve, and the throw thus given the crank imparts movement to the draft-pawl.

Two crank-stops, *q*, are fixed to the car, one each side of the crank *k'*. These, by arresting the throw of the crank, limit the movement of the draft-pawl *d*.

Two pawl-releasers, *n* and *n'*, each have one end pivoted to different ends of a three-pronged lever, *o*. The other end of each pawl-releaser has an incline, *d'*, which takes under the pawl *d*. One prong of the lever *o* is connected by a rod, *p*, with the sector-gear lever *e*. (See Fig. 1.) When the draft-pawl *d* is brought to bear on the ratchet-rim *c* by a pull on the draw-bar G, and just as it has completed its forward movement, the inclined end *d'* of the pawl-releaser *n* is pushed below the draft-pawl *d*, and by raising the said pawl serves to release its engagement from the ratchet-rim *c*, and as long as the draw-bar G is kept pulled out this releaser *n* will continue to keep the draft-pawl raised and out of contact with the ratchet-rim, whereby the car-wheel *b* will turn without the draft-pawl producing a clicking noise. When there is no pull on the draw-bar G, the spring *i* will cause the draft-pawl *d* to recede to the position shown in Fig. 2, and then the pawl-releaser *n'* will raise the draft-pawl from the ratchet-rim *c* and allow the car to be backed.

This car-starter will, on street-railways that are level, enable one animal to do the work that it requires two to perform without it.

It will be understood that when the draw-bar G is drawn out to its limit a stop or shoulder, *r*, on the bar comes against the bearing *h'*, and then the strain of the draft is no longer on the lever *e*.

Having described my invention, I claim and desire to secure by Letters Patent of the United States—

1. In a car-starter, the combination of a ratchet-wheel, a draft-pawl, *d*, a draw-bar, G, a lever, *e*, having one end connected to the draw-bar and provided with sector-gear *e'*, a shaft, *k*, having at one end a pinion, *l*, engaging with the sector-gear, and provided at the other end with a crank, *k'*, connected with the draft-pawl, and a spring, *i*, connected with the sector-gear lever, for the purpose set forth.

2. In a car-starter, the combination of a ratchet-wheel, a draft-pawl, *d*, a draw-bar, G, a lever, *e*, and mechanism, substantially as described, connecting the draft-pawl and draw-bar, two pawl-releasers, *n n'*, having inclined ends *d'*, which take under the said draft-pawl, a three-pronged lever, *o*, and a rod, *p*, connecting the three-pronged lever with the said lever *e*, as shown and described.

In testimony whereof I affix my signature in the presence of two witnesses.

OLIVER P. WIVEL.

Witnesses:
 JOHN E. MORRIS,
 JNO. T. MADDOX.